United States Patent
Armstrong et al.

(10) Patent No.: US 8,027,805 B2
(45) Date of Patent: *Sep. 27, 2011

(54) EXECUTING AN OVERALL QUANTITY OF DATA PROCESSING WITHIN AN OVERALL PROCESSING PERIOD

(75) Inventors: Troy D. Armstrong, Rochester, MN (US); Naresh Nayar, Rochester, MN (US); Gary R. Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 194 days.

This patent is subject to a terminal disclaimer.

(21) Appl. No.: 12/349,877

(22) Filed: Jan. 7, 2009

(65) Prior Publication Data

US 2009/0112518 A1    Apr. 30, 2009

Related U.S. Application Data

(63) Continuation of application No. 11/008,791, filed on Dec. 9, 2004, now Pat. No. 7,487,065.

(51) Int. Cl.
  *G06F 3/01*  (2006.01)
  *G06F 3/00*  (2006.01)
  *G04F 5/00*  (2006.01)
  *G04F 1/00*  (2006.01)
(52) U.S. Cl. ......... 702/182; 702/176; 702/177; 702/183
(58) Field of Classification Search ............... 702/89, 702/106, 11, 176, 177, 182, 183, 186, 189; 365/194; 370/347; 375/142; 710/36; 717/127
See application file for complete search history.

(56) References Cited

U.S. PATENT DOCUMENTS

| | | | |
|---|---|---|---|
| 5,319,776 A * | 6/1994 | Hile et al. | 726/24 |
| 6,111,910 A * | 8/2000 | Cui et al. | 375/142 |
| 6,249,518 B1 * | 6/2001 | Cui | 370/347 |
| 6,275,987 B1 * | 8/2001 | Fraley et al. | 717/127 |
| 6,292,869 B1 | 9/2001 | Gerchman et al. | |
| 6,735,129 B2 * | 5/2004 | Akasaki et al. | 365/194 |
| 7,487,065 B2 * | 2/2009 | Armstrong et al. | 702/182 |

OTHER PUBLICATIONS

BAE Systems; http://www.iews.na.baesystems.com/ads/; AN-6, Mar. 2000, Version 1.0.

* cited by examiner

*Primary Examiner* — Michael Nghiem
*Assistant Examiner* — Felix E Suarez
(74) *Attorney, Agent, or Firm* — Biggers & Ohanian, LLP; James R. Nock

(57) ABSTRACT

Exemplary methods, systems, and products are described for executing an overall quantity of data processing within an overall processing period that include executing repeatedly through a series of iterations a portion of the overall quantity of data processing that can be completed in a set processing period, wherein each iteration includes the set processing period and a variable delay period and calculating the variable delay period for an iteration in dependence upon the set processing period, a portion of the overall quantity of data processing performed during the set processing period of the iteration, the overall quantity of data processing, and the overall processing period.

31 Claims, 8 Drawing Sheets

```
01      #include <time.h>
02      time_t time();
03      time_t crtTime;
04      int correctMemoryError(int SPP); /* the workhorse function */
05
06      int VDP; /* variable delay period */
07      int crtPortion; /* portion done in current iteration */
08      int SPP = ...; /* set processing period */
09      int overallPeriod = ...; /* set to duration of overall processing period */
10      int remainingTime = overallPeriod; /* initial value */
11      int overallQuantity = ...; /* set to overall quantity of data processing */
12      int remainingQuantity = overallQuantity; /* initial value */
13
14      main() {
15              timeLimit = time() + overallPeriod;  /* establish time limit */
16              while(true) { /* while loop runs forever */
17                      crtPortion = correctMemoryErrors(SPP);
18                      remainingQuantity = remainingQuantity – crtPortion;
19                      if(remainingQuantity <= 0) exit();  /* if finished, exit application */
20                      crtTime = time(); /* system call to system clock */
21                      remainingTime = timeLimit – crtTime;
22                      /* calculate variable delay period */
23                      VDP = ((crtPortion * remainingTime) / remainingQuantity) – SPP
24                      sleep(VDP); /* wait through the delay period */
25                      /* loop: continue processing */
26              } /* end while */
27      } /* end main */
```

EXECUTING AN OVERALL QUANTITY OF DATA PROCESSING WITHIN AN OVERALL PROCESSING PERIOD

CROSS-REFERENCE TO RELATED APPLICATION

This application is a continuation application of and claims priority from U.S. patent application Ser. No. 11/008,791 filed on Dec. 9, 2004, now U.S. Pat. No. 7,487,065, issued on Feb. 3, 2009.

BACKGROUND OF THE INVENTION

1. Field of the Invention

The field of the invention is data processing, or, more specifically, methods, apparatus, systems, and products for executing an overall quantity of data processing within an overall processing period.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. The most basic requirements levied upon computer systems, however, remain little changed. A computer system's job is to access, manipulate, and store information. Computer system designers are constantly striving to improve the way in which a computer system can deal with information.

A computer system typically operates according to computer program instructions in computer programs. The computer program instructions are stored in computer memory and executed one-by-one on one or more computer processors. Multiple computer programs organized in separate thread of execution can run on the same computer at the same time, by sharing a processor in time slices, by running on multiple processors, or both. Computer processors are fast, executing millions of computer program instructions per second. No matter how fast a processor is, though, executing a computer program or a thread of execution takes time, and sometimes priorities of execution can conflict. A system program, for example, may take so much time to run that it may interfere with the perceived operation of a user's application.

SUMMARY OF THE INVENTION

Exemplary methods, apparatus, systems, and products are described for executing an overall quantity of data processing within an overall processing period that include executing repeatedly through a series of iterations a portion of the overall quantity of data processing that can be completed in a set processing period, wherein each iteration includes the set processing period and a variable delay period and calculating the variable delay period for an iteration in dependence upon the set processing period, a portion of the overall quantity of data processing performed during the set processing period of the iteration, the overall quantity of data processing, and the overall processing period. Calculating the variable delay period for an iteration alternatively may be carried out in dependence upon the set processing period, a portion of the overall quantity of data processing performed during the set processing period of the iteration, a remainder of the overall quantity of data processing, and a remainder of the overall processing period.

The set processing period may be a predefined period of an iteration when a portion of the overall quantity of data processing is executed. The variable delay period typically is a variable period of an iteration, the duration of which is calculated during the iteration, when none of the overall quantity of data processing is executed. The overall processing period may be characterized by a processing time limit, and the remainder of the overall processing period may be defined as the processing time limit less the time during the iteration when the variable delay period is calculated. The remainder of the overall amount of data processing may be defined as the overall quantity of data processing less the cumulative portion of the overall quantity of data processing that was performed during the set processing periods of a current iteration and previous iterations.

Calculating the variable delay period may be carried out by calculating the variable delay period for each iteration so that a processing velocity for the iteration is equal to the overall processing velocity required to complete the overall amount of data processing within the overall processing period. That is, calculating the variable delay period further may be carried out by calculating the variable delay period according to the expression:

$$t_i = \left(\frac{P_L T_T}{S_T}\right) - t_r,$$

where $t_i$ represents the variable delay period for an iteration, $P_L$ represents the portion of the overall quantity of data processing performed during the set processing period of the iteration, $T_T$ represents the overall processing period, $S_T$ represents the overall amount of data processing, and $t_r$ represents the set processing period.

Calculating the variable delay period alternatively may be carried out by calculating the variable delay period for each iteration so that a processing velocity for the iteration is equal to the overall processing velocity required to complete the remainder of the overall amount of data processing within the remainder of the overall processing period. That is, calculating the variable delay period may be carried out by calculating the variable delay period according to the expression:

$$t_i = \left(\frac{P_L T_R}{S_R}\right) - t_r,$$

where $t_i$ represents the variable delay period for an iteration, $P_L$ represents the portion of the overall quantity of data processing performed during the set processing period of the iteration, $T_R$ represents the remainder of the overall processing period, $S_R$ represents the remainder of the overall amount of data processing, and $t_r$ represents the set processing period.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 6 sets forth a pseudocode listing illustrating a further exemplary method for executing an overall quantity of data processing within an overall processing period according to embodiments of the present invention.

DETAILED DESCRIPTION OF EXEMPLARY EMBODIMENTS

Figure 1:
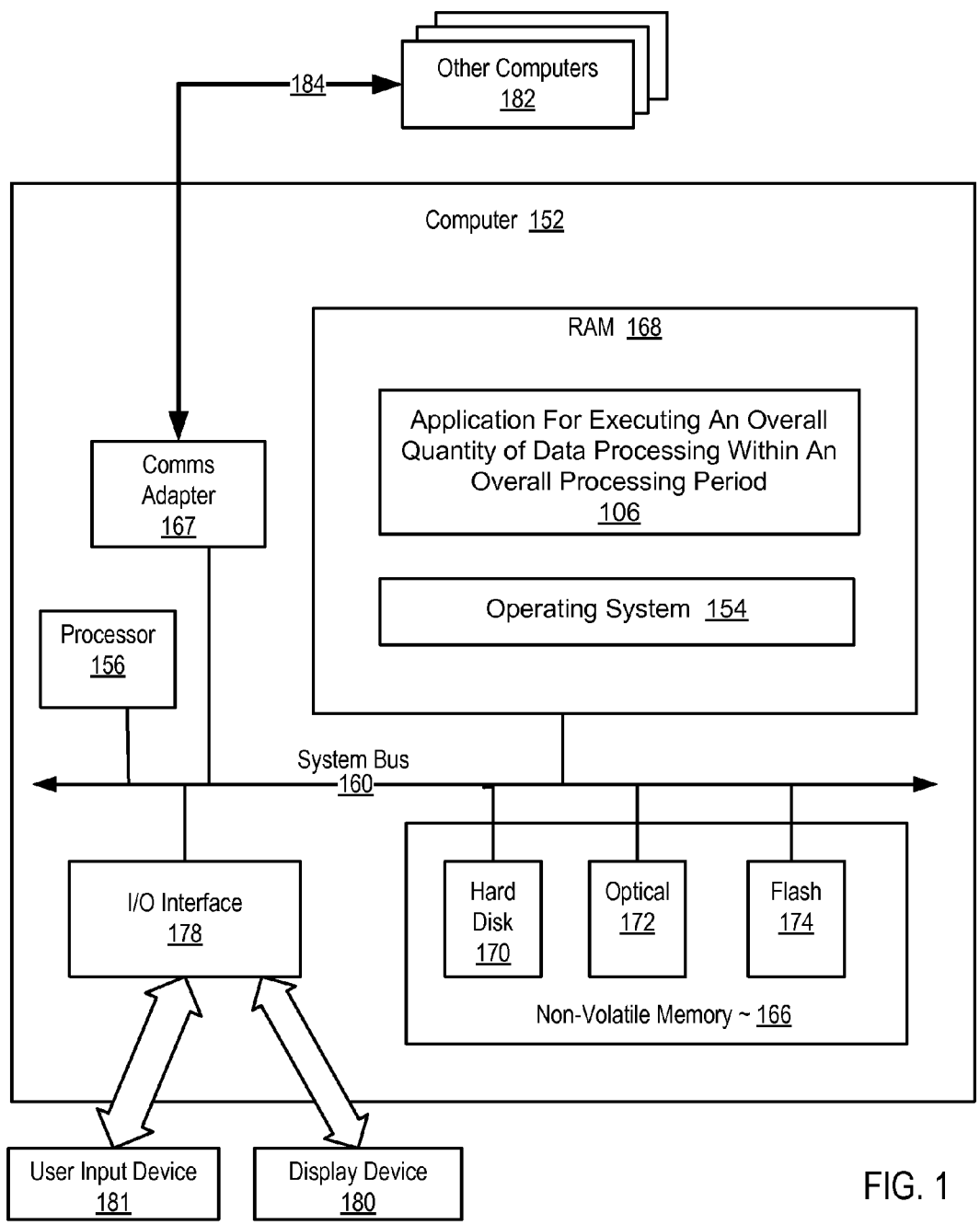
FIG. 1 sets forth a block diagram of automated computing machinery comprising an exemplary computer useful in executing an overall quantity of data processing within an overall processing period according to embodiments of the present invention.

Executing an Overall Quantity of Data Processing within an Overall Processing Period Exemplary methods, apparatus, systems, and products for executing an overall quantity of data processing within an overall processing period in accordance with the present invention are described with reference to the accompanying drawings, beginning with FIG. 1. Executing an overall quantity of data processing within an overall processing period in accordance with the present invention is generally implemented with computers, that is, with automated computing machinery. FIG. 1 sets forth a block diagram of automated computing machinery comprising an exemplary computer (152) useful in executing an overall quantity of data processing within an overall processing period according to embodiments of the present invention. The computer (152) of FIG. 1 includes at least one computer processor (156) or 'CPU' as well as random access memory (168) ("RAM") which is connected through a system bus (160) to processor (156) and to other components of the computer.

Stored in RAM (168) is an application (106) for executing an overall quantity of data processing within an overall processing period, that is, computer program instructions for an overall quantity of data processing within an overall processing period according to embodiments of the present invention. Also stored in RAM (168) is an operating system (154). Operating systems useful in computers according to embodiments of the present invention include UNIX™, Linux™, Microsoft NT™, IBM's AIX™, IBM's i5/OS™, and many others as will occur to those of skill in the art. Operating system (154) and application (106) the example of FIG. 1 are shown in RAM (168), but many components of such software typically are stored in non-volatile memory (166) also.

Computer (152) is programmed through application (106) to execute an overall quantity of data processing within an overall processing period by executing repeatedly through a series of iterations a portion of the overall quantity of data processing that can be completed in a set processing period (where each iteration includes the set processing period and a variable delay period) and calculating the variable delay period for an iteration in dependence upon the set processing period, a portion of the overall quantity of data processing performed during the set processing period of the iteration, the overall quantity of data processing, and the overall processing period. As explained in more detail below, calculating a variable delay period for each iteration typically is carried out by calculating a delay period for an iteration that effectively sets the processing velocity for the iteration to the overall processing velocity needed to execute the overall quantity of data processing within the overall processing period. The presence of the delay allows other applications to run, so that application (106) can do its work in a small portion of the overall data processing capacity of the computer (152). Varying the delay iteration-by-iteration enables the average processing velocity across iterations to approximate the overall processing velocity needed to execute the overall quantity of data processing within the overall processing period.

Computer (152) of FIG. 1 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 1 includes a communications adapter (167) for implementing data communications (184) with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 2:
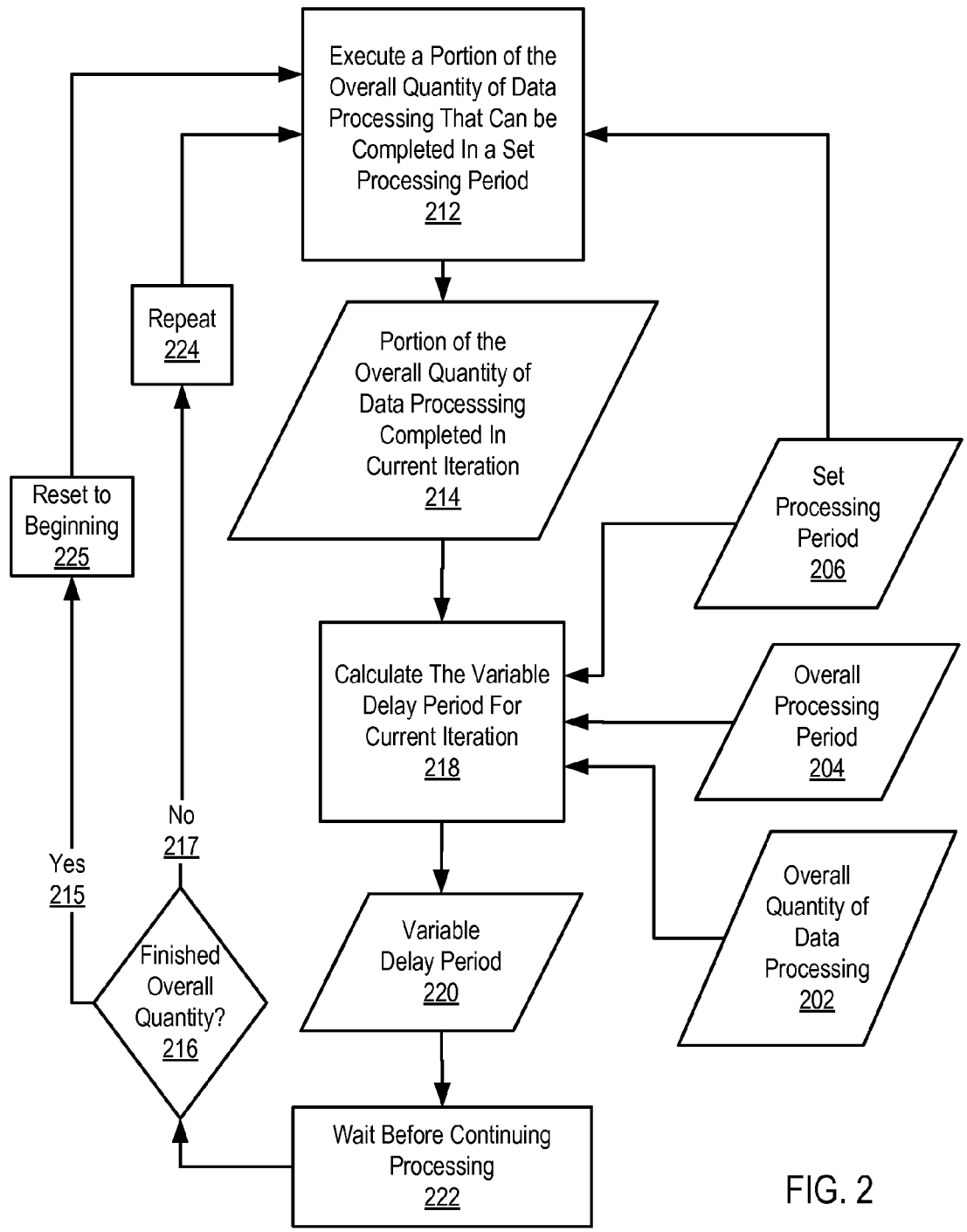
FIG. 2 sets forth a flow chart illustrating an exemplary method for executing an overall quantity of data processing within an overall processing period according to embodiments of the present invention FIG. 3 sets forth a flow chart illustrating a further exemplary method for executing an overall quantity of data processing within an overall processing period according to embodiments of the present invention.

Executing an Overall Quantity of Data Processing within an Overall Processing Period—With the Overall Quantity of Data Processing and the Overall Processing Period For further explanation, FIG. 2 sets forth a flow chart illustrating a further exemplary method for executing an overall quantity (202) of data processing within an overall processing period (204) according to embodiments of the present invention that includes executing (212) repeatedly through a series of iterations a portion of the overall quantity of data processing that can be completed in a set processing period (206). In the example of FIG. 2, method steps (212, 218, 222), executed in a loop, make up an iteration, and each iteration includes a set processing period (206) and a variable delay period (220). The set processing period is a predefined period of an iteration when a portion (214) of the overall quantity (202) of data processing is executed (212). The set processing period typically is preset before iterations begin, so that the set processing period typically remains the same from iteration to iteration. The variable delay period (220) is a variable period of an iteration when none of the overall quantity of data processing is executed. The variable delay period is variable because the duration of the variable delay period for an iteration is calculated during the iteration, so that the duration of the delay period typically varies from iteration to iteration.

In the example of FIG. 2, executing (212) a portion of the overall quantity of data processing that can be completed in a set processing period (206) is carried out by executing whatever portion of the overall quantity of data processing that it is possible to complete during the set processing period. The portion of the overall quantity of data processing that can be so completed varies from iteration to iteration and is therefore tracked and reported by the execution process (212) as the portion of the overall quantity of data processing completed in the current iteration (214).

The method of FIG. 2 includes calculating (218) the variable delay period (220) for an iteration in dependence upon the set processing period (206), a portion (214) of the overall quantity of data processing completed during the set processing period of the iteration, the overall quantity (202) of data processing, and the overall processing period (204). In the example of FIG. 2, calculating (218) the variable delay period may be carried out by calculating the variable delay period (220) for each iteration so that a processing velocity for the iteration is equal to the overall processing velocity required to complete the overall amount of data processing within the overall processing period. That is, calculating (218) the variable delay period (220) may be carried out so that $$\frac{P_L}{t_r + t_i} = \frac{S_T}{T_T}, \quad \text{Exp. 1}$$

where $t_i$ represents the variable delay period for each iteration, $P_L$ represents the portion of the overall quantity of data processing performed during the set processing period of the current iteration, $T_T$ represents the overall processing period, $S_T$ represents the overall amount of data processing, and $t_r$ represents the set processing period. In this example, the expression $$\frac{P_L}{t_r + t_i} \quad \text{Exp. 2}$$

represents a processing velocity for the iteration, and the expression $$\frac{S_T}{T_T} \quad \text{Exp. 3}$$

represents an overall processing velocity required to complete the overall amount of data processing within the overall processing period. Exp. 1 may be rewritten to solve for the variable delay period $t_i$, so that calculating (218) the variable delay period (220) may be carried out according to the expression $$t_i = \left(\frac{P_L T_T}{S_T}\right) - t_r, \quad \text{Exp. 4}$$

where $t_i$ represents the variable delay period for an iteration, $P_L$ represents the portion of the overall quantity of data processing performed during the set processing period of the iteration, $T_T$ represents the overall processing period, $S_T$ represents the overall amount of data processing, and $t_r$ represents the set processing period.

The method of FIG. 2, having calculated (218) a variable delay period (220) for the current iteration, then waits (222) through the variable delay period before continuing processing. Waiting (222) may be accomplished through a system call such as a Unix sleep( ) call, or otherwise as will occur to those of skill in the art. Waiting through the variable delay period gives other applications an opportunity to execute. After waiting (222) through the variable delay period, processing in the method of FIG. 2 continues with repetition (224) of the steps in the iterative loop. The iterations continue (217, 224) until the overall quantity of data processing is finished (215), when the process parameters are reset (225) to their beginning values and the overall quantity of data processing begins again. The method of FIG. 2 then continues processing forever, unless of course it is interrupted by outside intervention, by a user interruption or a power failure, for example.

Figure 3:
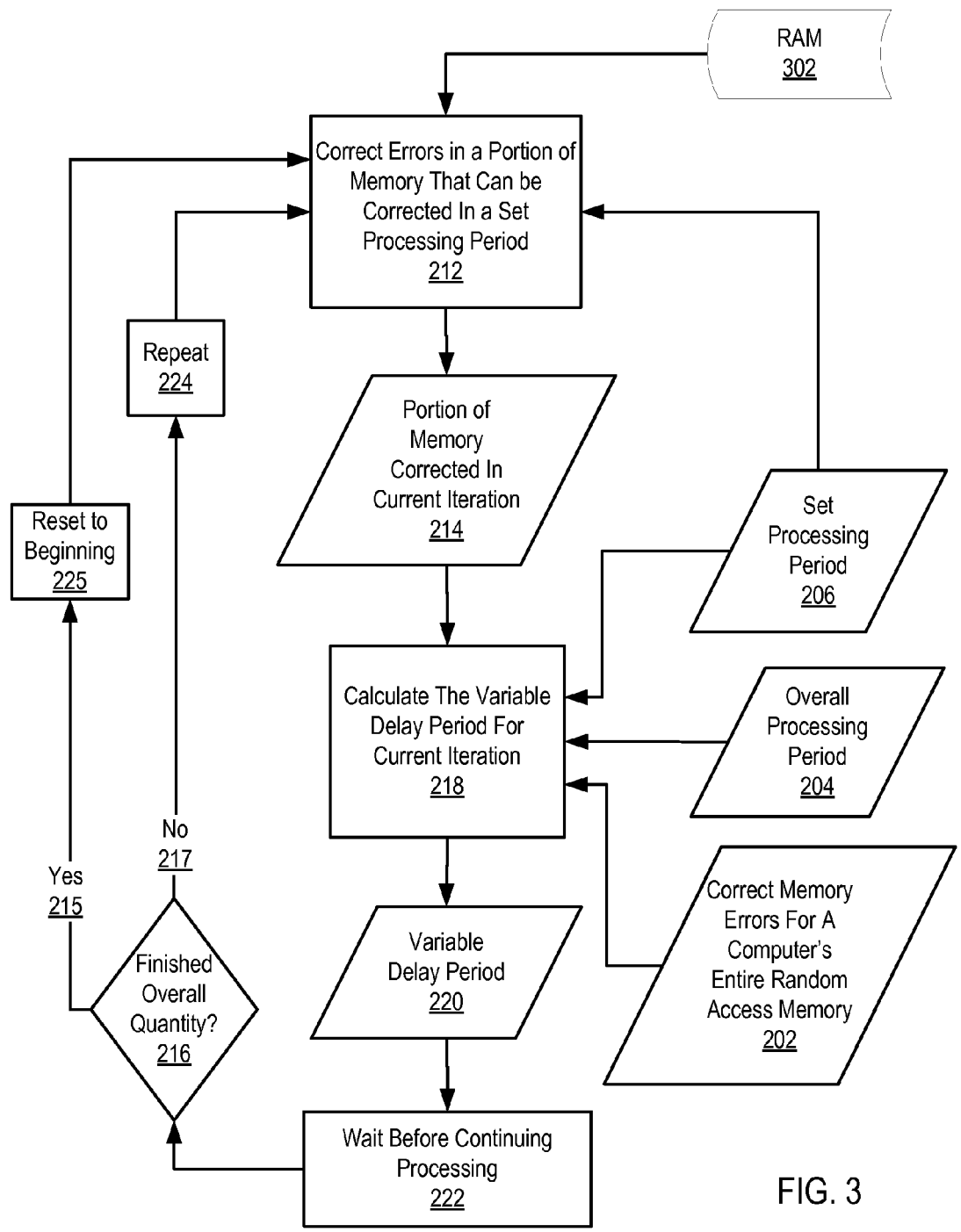

Correcting Memory Errors in an Overall Quantity of Random Access Memory within an Overall Processing Period For further explanation, FIG. 3 sets forth a flow chart illustrating a further exemplary method for executing an overall quantity (202) of data processing within an overall processing period (204) according to embodiments of the present invention. The example of FIG. 3 is oriented to the problem domain of memory error correction. In the method of FIG. 3, the data processing to be executed within an overall processing period (204) is memory error correction, and the overall quantity of data processing is correcting memory errors (202) for a computer's entire random access memory (302).

Memory parity bits can be used to detect the presence of a memory error, but parity alone is not enough to correct memory errors. Memory error correction, sometimes called memory scrubbing, is the process of establishing multiple check bits that enable not only detecting a memory error but also determining which bit is in error and correcting the error. Not all memory errors are single-bit errors. Memory errors caused by aging, heat, radiation, and so on, if left uncorrected, can become multiple-bit errors, which are much more difficult to correct. Early detection and correction of memory errors therefore is advantageous.

The method of FIG. 3 includes correcting errors (212) in a portion of memory that can be corrected in a set processing period (206), an example of executing repeatedly through a series of iterations a portion of the overall quantity of data processing that can be completed in a set processing period. In the example of FIG. 3, method steps (212, 218, 222), executed in a loop, make up an iteration, and each iteration includes a set processing period (206) and a variable delay period (220). The set processing period is a predefined period of an iteration when memory errors are corrected, that is, when a portion (214) of the memory errors are corrected for a computer's entire random access memory. The set processing period typically is preset before iterations begin, so that the set processing period typically remains the same from iteration to iteration. The variable delay period (220) is a variable period of an iteration when no memory errors are corrected. As described above with reference to the method of FIG. 2, the variable delay period is variable because the duration of the variable delay period for an iteration is calculated during the iteration, so that the duration of the delay period typically varies from iteration to iteration.

In the example of FIG. 3, correcting errors (212) in a portion of the memory that can be corrected in a set processing period (206) is carried out by correcting all the errors that can be corrected in the set processing period. The portion of the overall quantity of data processing that can be so completed varies from iteration to iteration and is therefore tracked and reported by the execution process (212) as the portion of the computer's entire random access memory for which memory errors are corrected in the current iteration (214).

The method of FIG. 3 includes calculating (218) the variable delay period (220) for an iteration in dependence upon the set processing period (206), a portion (214) of the overall quantity of data processing (in this example, memory error correction) performed during the set processing period of the iteration, the overall quantity (202) of data processing (in this example, the entire RAM), and the overall processing period. As described above with reference to the method of FIG. 2, in the example of FIG. 3, calculating (218) the variable delay period may be carried out by calculating the variable delay period (220) for each iteration so that a processing velocity for the iteration is equal to the overall processing velocity required to complete the overall amount of data processing within the overall processing period. That is, calculating (218) the variable delay period (220) may be carried out so that $$\frac{P_L}{t_r + t_i} = \frac{S_T}{T_T}, \quad \text{Exp. 1}$$

where $t_i$ represents the variable delay period for each iteration, $P_L$ represents the portion of the overall quantity of data processing performed during the set processing period of the current iteration (in this example, the portion (214) of memory corrected in the current iteration), $T_T$ represents the overall processing period, $S_T$ represents the overall amount of data processing (in this example, an entire RAM), and $t_r$ represents the set processing period. In this example, the expression $$\frac{P_L}{t_r + t_i} \quad \text{Exp. 2}$$

represents a processing velocity for the iteration, and the expression $$\frac{S_T}{T_T} \quad \text{Exp. 3}$$

represents an overall processing velocity required to complete the overall amount of data processing within the overall processing period. Exp. 1 may be rewritten to solve for the variable delay period $t_i$, so that calculating (218) the variable delay period (220) may be carried out according to the expression $$t_i = \left(\frac{P_L T_T}{S_T}\right) - t_r, \quad \text{Exp. 4}$$

where $t_i$ represents the variable delay period for an iteration, $P_L$ represents the portion of the overall quantity of data processing performed during the set processing period of the iteration, $T_T$ represents the overall processing period, $S_T$ represents the overall amount of data processing, and $t_r$ represents the set processing period.

The method of FIG. 3, having calculated (218) a variable delay period (220) for the current iteration, then waits (222) through the variable delay period before continuing processing. Waiting (222) may be accomplished through a system call such as a Unix sleep( ) call, or otherwise as will occur to those of skill in the art. Waiting through the variable delay period gives other applications an opportunity to execute. After waiting (222) through the variable delay period, processing in the method of FIG. 3 continues with repetition (224) of the steps in the iterative loop. The iterations continue (217, 224) until the entire RAM has been scrubbed (215), when the process parameters, in this case, memory pointers, are reset (225) to their beginning values, in this case, to the beginning of the RAM address space, and the overall quantity of data processing begins again. The method of FIG. 2 then continues processing forever, scrubbing the entire RAM from beginning to end, resetting, and starting over again from the beginning, unless of course it is interrupted by outside intervention, by a user interruption or a power failure, for example.

Executing an Overall Quantity of Data Processing within an Overall Processing Period—With Remainders Sharp-eyed readers will have noticed that calculating the variable delay period so that the processing velocity for an iteration is equal to the overall processing velocity required to complete the overall amount of data processing within the overall processing period will often represent an approximation. Many computers upon which such calculations are performed are multiprocessing computers. An application for executing an overall quantity of data processing within an overall processing period according to embodiments of the present invention will often be implemented as a process or thread of execution that shares a processor in time slices with other applications. Such a thread moves back and forth from run state to ready state to wait state, gains and loses possession of the processor, due to preemption by higher priority threads, at the end of each of its own time slices, in response to its own system calls, and so on. The duration of such losses of the processor may be entirely invisible to the thread, which will affect the accuracy of its processing velocity calculations. In many applications, the approximation may be entirely adequate regardless of this source of inaccuracy. In other, more accuracy may be desirable.

One way to improve accuracy is to calculate the overall processing velocity in dependence upon the amount of the overall quantity of data processing that has already been performed—and then set the iteration processing velocity accordingly. That is, calculate the variable delay period for an iteration in dependence upon the set processing period, a portion of the overall quantity of data processing performed during the set processing period of the iteration, a remainder of the overall quantity of data processing, and a remainder of the overall processing period. This specification describes below exemplary methods, apparatus, systems, and processes for executing an overall quantity of data processing within an overall processing period that reduce timing inaccuracies introduced by interrupts in a processing environment.

Figure 4:
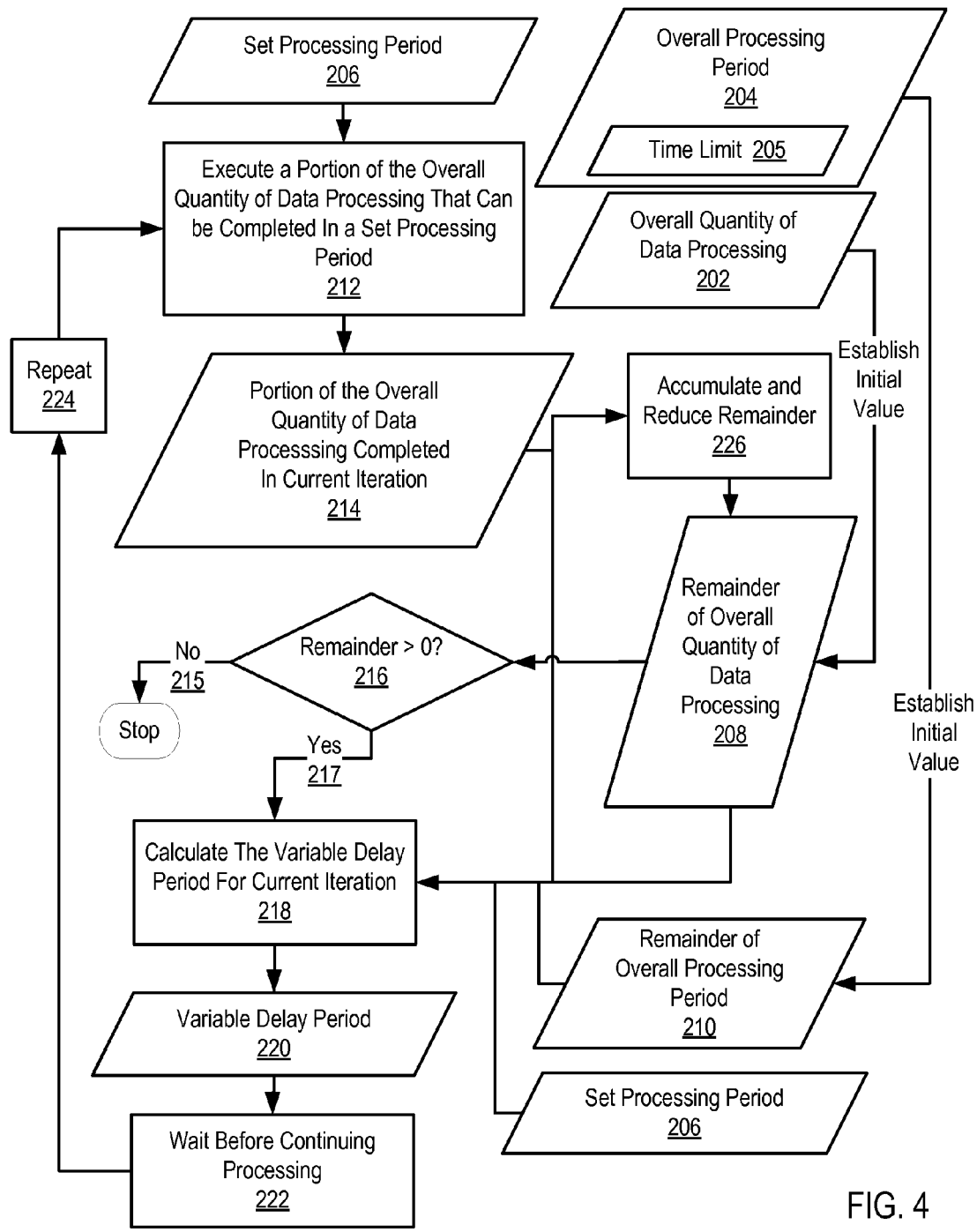
FIG. 4 sets forth a flow chart illustrating a further exemplary method for executing an overall quantity of data processing within an overall processing period according to embodiments of the present invention FIG. 5 sets forth a flow chart illustrating a further exemplary method for executing an overall quantity of data processing within an overall processing period according to embodiments of the present invention.

For further explanation therefore, FIG. 4 sets forth a flow chart illustrating a further exemplary method for executing an overall quantity (202) of data processing within an overall processing period (204) according to embodiments of the present invention that includes executing (212) repeatedly through a series of iterations a portion of the overall quantity of data processing that can be completed in a set processing period (206). In the example of FIG. 4, method steps (212, 216, 218, 222, 226), executed in a loop, make up an iteration, and each iteration includes a set processing period (206) and a variable delay period (220). The set processing period is a predefined period of an iteration when a portion (214) of the overall quantity (202) of data processing is executed (212). The set processing period typically is preset before iterations begin, so that the set processing period typically remains the same from iteration to iteration. The variable delay period (220) is a variable period of an iteration when none of the overall quantity of data processing is executed. The variable delay period is variable because the duration of the variable delay period for an iteration is calculated during the iteration, so that the duration of the delay period typically varies from iteration to iteration.

In the example of FIG. 4, executing (212) a portion of the overall quantity of data processing that can be completed in a set processing period (206) is carried out by executing whatever portion of the overall quantity of data processing that it is possible to complete during the set processing period. The portion of the overall quantity of data processing that can be so completed varies from iteration to iteration and is therefore tracked and reported by the execution process (212) as the portion of the overall quantity of data processing completed in the current iteration (214).

The method of FIG. 4 includes determining (216) whether the overall quantity of data processing has been executed by comparing with zero a remainder (208) of the overall quantity of data processing. The overall quantity of data processing (202) functions as a startup parameter to establish the initial value of the remainder (208). The method of FIG. 4 then determines the remainder in each iteration by accumulating (226) the portions of the overall quantity of data processing completed in each iteration and subtracting it from the overall amount of data processing to produce remainder (208). That is, in the example of FIG. 4, the remainder (208) of the overall amount of data processing is the overall quantity (202) of data processing less the cumulative portion (214) of the overall quantity of data processing that was performed during the set processing periods of the current iteration and previous iterations. If the remainder is zero (215), processing stops. If the remainder is greater than zero (217), processing continues with calculation of a variable delay period.

The method of FIG. 4 includes calculating (218) the variable delay period (220) for an iteration in dependence upon the set processing period (206), a portion (214) of the overall quantity of data processing performed during the set processing period of the iteration, a remainder (208) of the overall quantity of data processing, and a remainder (210) of the overall processing period. In the method of FIG. 4, the overall processing period (204) may be characterized by a processing time limit (205). That is, the overall processing period may be identified as a start time and end time. The end time may be characterized as a processing time limit, a target time when the overall quantity of data processing is to be finished. In that case, the remainder (210) of the overall processing period may be implemented as the processing time limit less the time during the iteration when the variable delay period is calculated (218). That is, the remainder of the overall processing period in this example is the processing time limit less the time during the iteration when the variable delay period is calculated.

In the example of FIG. 4, calculating (218) the variable delay period may be carried out by calculating the variable delay period (220) for each iteration so that a processing velocity for the iteration is equal to the overall processing velocity required to complete the remainder of the overall amount of data processing within the remainder of the overall processing period. That is, calculating (218) the variable delay period (220) may be carried out so that $$\frac{P_L}{t_r + t_i} = \frac{S_R}{T_R}, \quad \text{Exp. 5}$$

where $t_i$ represents the variable delay period for each iteration, $P_L$ represents the portion of the overall quantity of data processing performed during the set processing period of the current iteration, $T_R$ represents the remainder of the overall processing period, $S_R$ represents the remainder of the overall amount of data processing, and $t_r$ represents the set processing period. In this example, the expression $$\frac{P_L}{t_r + t_i} \quad \text{Exp. 6}$$

represents a processing velocity for the iteration, and the expression $$\frac{S_R}{T_R} \quad \text{Exp. 7}$$

represents an overall processing velocity required to complete the remainder of the overall amount of data processing within the remainder of the overall processing period. Exp. 1 may be rewritten to solve for the variable delay period $t_i$, so that calculating (218) the variable delay period (220) may be carried out according to the expression $$t_i = \left(\frac{P_L T_R}{S_R}\right) - t_r, \quad \text{Exp. 8}$$

where $t_i$ represents the variable delay period for an iteration, $P_L$ represents the portion of the overall quantity of data processing performed during the set processing period of the iteration, $T_R$ represents the remainder of the overall processing period, $S_R$ represents the remainder of the overall amount of data processing, and $t_r$ represents the set processing period.

The method of FIG. 4, having calculated (218) a variable delay period (220) for the current iteration, then waits (222) through the variable delay period before continuing processing. Waiting (222) may be accomplished through a system call such as a Unix sleep( ) call, or otherwise as will occur to those of skill in the art. Waiting through the variable delay period gives other applications an opportunity to execute. After waiting (222) through the variable delay period, processing in the method of FIG. 4 continues with repetition (224) of the steps in the iterative loop. The iterations continue until the remainder (208) of the overall quantity of data processing is reduced to zero (215).

Correcting Memory Errors—With Remainders

Figure 5:
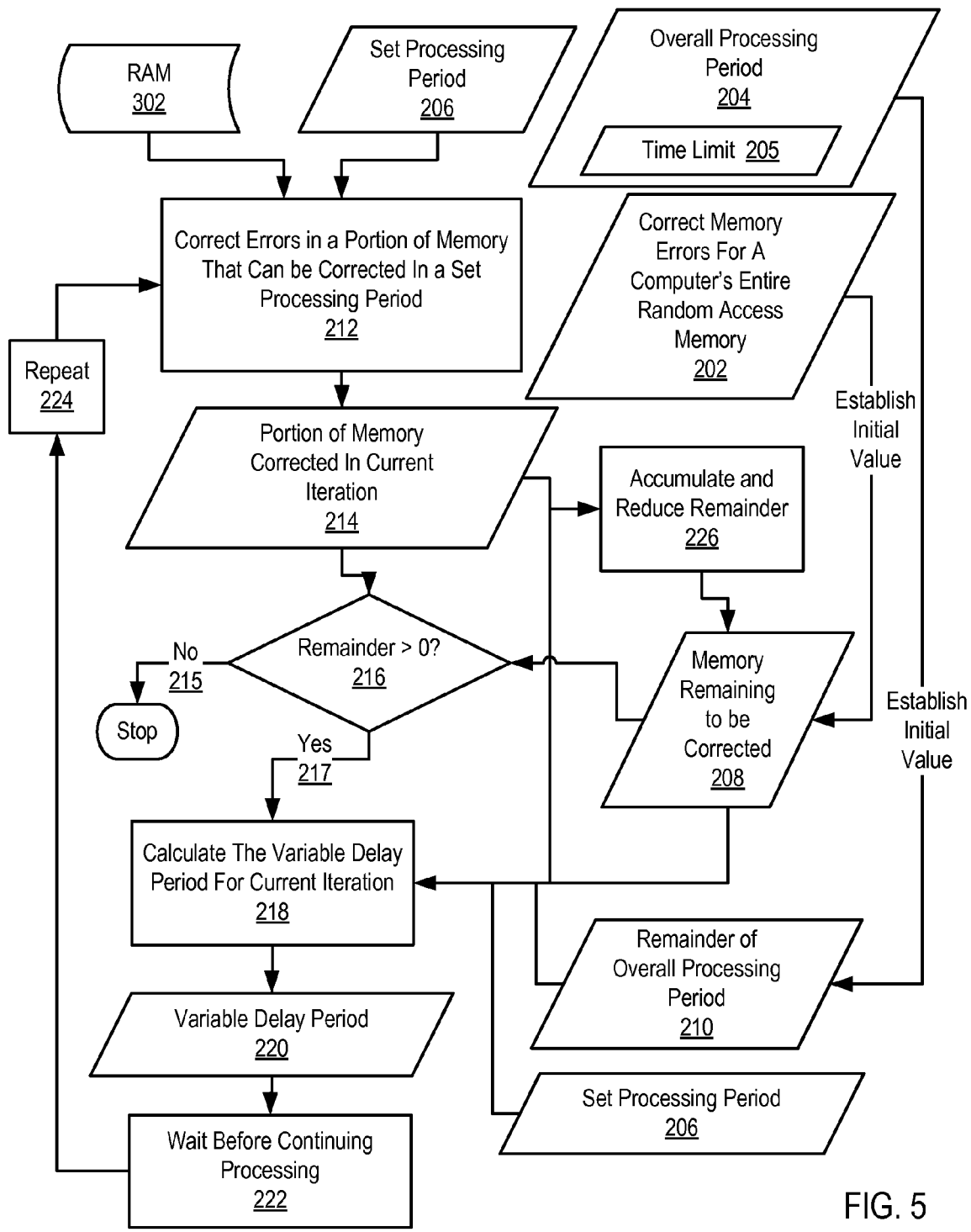

For further explanation, FIG. 5 sets forth a flow chart illustrating a further exemplary method for executing an overall quantity (202) of data processing within an overall processing period (204) according to embodiments of the present invention. The example of FIG. 5 is oriented to the problem domain of memory error correction. In the method of FIG. 5, the data processing to be executed within an overall processing period (204) is memory error correction, and the overall quantity of data processing is correcting memory errors (202) for a computer's entire random access memory (302).

The method of FIG. 5 includes correcting errors (212) in a portion of memory that can be corrected in a set processing period (206), an example of executing repeatedly through a series of iterations a portion of the overall quantity of data processing that can be completed in a set processing period. In the example of FIG. 5, method steps (212, 216, 218, 222, 226), executed in a loop, make up an iteration, and each iteration includes a set processing period (206) and a variable delay period (220). The set processing period is a predefined period of an iteration when memory errors are corrected, that is, when a portion (214) of the memory errors are corrected for a computer's entire random access memory. The set processing period typically is preset before iterations begin, so that the set processing period typically remains the same from iteration to iteration. The variable delay period (220) is a variable period of an iteration when no memory errors are corrected. As described above with reference to the method of FIG. 5, the variable delay period is variable because the duration of the variable delay period for an iteration is calculated during the iteration, so that the duration of the delay period typically varies from iteration to iteration.

In the example of FIG. 5, correcting errors (212) in a portion of the memory that can be corrected in a set processing period (206) is carried out by correcting all the errors that can be corrected in the set processing period. The portion of the overall quantity of data processing that can be so completed varies from iteration to iteration and is therefore tracked and reported by the execution process (212) as the portion of the computer's entire random access memory for which memory errors are corrected in the current iteration (214).

The method of FIG. 5 includes determining (216) whether the overall quantity of data processing, that is, error correction for the entire random access memory, has been executed by comparing with zero a remainder (208) of the random access memory for which no memory error correction has yet been performed. The overall quantity of data processing (202) functions as a startup parameter to establish the initial value of the remainder (208). That is, for example, if the total size of random access memory 4 gigabytes, then the initial value of the remainder is set to 4 gigabytes. The method of FIG. 5 then determines the remainder (208) of the overall quantity of data processing for each iteration by accumulating (226) the portions of the memory corrected in each iteration and subtracting it from the overall amount of random access memory to be corrected. That is, in the example of FIG. 5, the remainder (208) of the overall amount of data processing is the memory remaining to be corrected, the overall quantity (202) of memory to be corrected less the cumulative portion (214) of the overall quantity of memory already corrected. That is, the remainder of the overall amount of data processing is the size of the computer memory less the cumulative quantity of computer memory for which memory errors were corrected in the current iteration and in previous iterations. If the remainder is zero (215), processing stops. If the remainder is greater than zero (217), processing continues with calculation of a variable delay period.

The method of FIG. 5 includes calculating (218) the variable delay period (220) for an iteration in dependence upon the set processing period (206), a portion (214) of the overall quantity of data processing (in this example, memory error correction) performed during the set processing period of the iteration, a remainder (208) of the overall quantity of data processing (memory remaining to be corrected), and a remainder (210) of the overall processing period. In the method of FIG. 5, the overall processing period (204) may be characterized by a processing time limit (205). That is, the overall processing period may be identified as a start time and end time. The end time may be characterized as a processing time limit, a target time when the overall quantity of data processing is to be finished. In that case, the remainder (210) of the overall processing period may be implemented as the processing time limit less the time during the iteration when the variable delay period is calculated (218).

As described above with reference to the method of FIG. 2, in the example of FIG. 5, calculating (218) the variable delay period may be carried out by calculating the variable delay period (220) for each iteration so that a processing velocity for the iteration is equal to the overall processing velocity required to complete the remainder of the overall amount of data processing within the remainder of the overall processing period. That is, calculating (218) the variable delay period (220) may be carried out so that $$\frac{P_L}{t_r + t_i} = \frac{S_R}{T_R}, \qquad \text{Exp. 5}$$

where $t_i$ represents the variable delay period for each iteration, $P_L$ represents the portion of the overall quantity of data processing performed during the set processing period of the current iteration (in this example, the portion (214) of memory corrected in the current iteration), $T_R$ represents the remainder of the overall processing period, $S_R$ represents the remainder of the overall amount of data processing (in this example, the memory (208) remaining to be corrected), and $t_r$ represents the set processing period. In this example, the expression $$\frac{P_L}{t_r + t_i} \qquad \text{Exp. 6}$$

represents a processing velocity for the iteration, and the expression $$\frac{S_R}{T_R} \qquad \text{Exp. 7}$$

represents an overall processing velocity required to complete the remainder of the overall amount of data processing within the remainder of the overall processing period. Exp. 1 may be rewritten to solve for the variable delay period $t_i$, so that calculating (218) the variable delay period (220) may be carried out according to the expression $$t_i = \left(\frac{P_L T_R}{S_R}\right) - t_r, \qquad \text{Exp. 8}$$

where $t_i$ represents the variable delay period for an iteration, $P_L$ represents the portion of the overall quantity of data processing performed during the set processing period of the iteration, $T_R$ represents the remainder of the overall processing period, $S_R$ represents the remainder of the overall amount of data processing, and $t_r$ represents the set processing period.

The method of FIG. 5, having calculated (218) a variable delay period (220) for the current iteration, then waits (222) through the variable delay period before continuing processing. Waiting (222) may be accomplished through a system call such as a Unix sleep( ) call, or otherwise as will occur to those of skill in the art. Waiting through the variable delay period gives other applications an opportunity to execute. After waiting (222) through the variable delay period, processing in the method of FIG. 5 continues with repetition (224) of the steps in the iterative loop. The iterations continue until the remainder (208) of the overall quantity of data processing is reduced to zero (215).

Correcting Memory Errors in an Overall Quantity of Random Access Memory within an Overall Processing Period—A Pseudocode Example For further explanation, FIG. 6 sets forth a pseudocode listing illustrating a further exemplary method for executing an overall quantity (202) of data processing within an overall processing period (204) according to embodiments of the present invention. The pseudocode listing of FIG. 6 is presented generally in the syntax of the C programming language. The listing is a 'pseudocode' listing, however, because it is presented only for explanation, not as a working model. The listing of FIG. 6 includes line numbers in a left column (402). The example of FIG. 6 continues the problem domain used in the example of FIG. 5, memory error correction.

In the example of FIG. 6, the variable named 'VDP,' declared in line 06, represents the variable delay period. The variable named 'crtPortion,' declared in line 07, represents the portion of the overall quantity of data processing performed during the set processing period of the iteration, that is, the portion of random access memory for which errors are corrected in the current iteration. The variable named 'SPP,' declared in line 08, represents the set processing period. The variable named 'overallPeriod,' declared in line 09, represents the overall processing period in which memory error correction is to be completed for an entire random access memory of a computer. The variable named 'remainingTime,' declared in line 10, represents the remainder of the overall processing period, initialized in line 10 to the duration of the overall processing period. The variable named 'overallQuantity,' declared in line 11, represents the overall quantity of data processing to be executed, that is, the size of the random access memory for which errors are to be corrected. The variable named 'remainingQuantity,' represents the remainder of the overall amount of data processing, initialized in line 12 as the overall quantity of data processing to be executed, that is, the size of the random access memory for which errors are to be corrected.

As described above, the overall processing period is characterized by a time limit. Line 15 in the listing of FIG. 6:

timeLimit=time( )+overallPeriod;

sets the time limit by adding the duration of the overall processing period to the current time when processing begins. Processing then enters a loop, at line 16 of the listing, that runs forever, that is, until exited internally. The loop represents a series of iterations. A portion of the overall quantity of data processing that can be completed in a set processing period is completed in each pass through the loop, so that each pass through the loop represents one such iteration.

Line 17:

crtPortion=correctMemoryErrors(SPP);

sets crtPortion to the portion of data processing executed during the current iteration. The function correctMemoryErrors( ) is the function that actually corrects memory errors in random access memory. CorrectMemoryErrors( ) takes SPP, the set processing period, as a call parameter, runs for the duration of the set processing period, and corrects memory errors in as much memory as possible during that time. CorrectMemoryErrors( ) tracks the amount of memory so corrected and returns that amount, at the end of the set processing period, for storage in crtPortion. Line 18 calculates the amount of memory remaining to be corrected after memory correction in the current iteration, and line 19 determines whether memory correction is finished. If the amount of memory remaining to be corrected is zero, line 19 exits the application. If the amount of memory remaining to be corrected is greater than zero, processing continues with calculation of the variable delay period for the current iteration.

Lines 20 and 21 obtain the current time from the system clock and calculate the time remaining in the overall processing period for executing memory error correction. Line 21 calculates the time remaining in the overall processing period for executing memory error correction by subtracting the current time from the time limit that characterizes the overall processing period. Line 23 calculates the variable delay period according to the expression $$t_i = \left(\frac{P_L T_R}{S_R}\right) - t_r, \qquad \text{Exp. 8}$$

where $t_i$ represents the variable delay period for an iteration (VDP in the listing of FIG. 6), $P_L$ represents the portion of the overall quantity of data processing performed during the set processing period of the iteration (crtPortion in the listing of FIG. 6), $T_R$ represents the remainder of the overall processing period (remainingTime in the listing of FIG. 6), $S_R$ represents the remainder of the overall amount of data processing (remainingQuantity in the listing of FIG. 6), and $t_r$ represents the set processing period (SPP in the listing of FIG. 6).

Line 24 causes a delay in further processing for the duration of the variable delay period for the current iteration as calculated in line 23. After return from the sleep( ) call of line 24, processing continues with another looping iteration. If processing reaches the end of the loop, it will always continue with further processing in this example because the only exit from the loop is near the center of the loop at line 19.

Correcting Memory Errors in an Overall Quantity of Random Access Memory within an Overall Processing Period—A Use Case For further explanation, an exemplary use case is presented in the problem domain of memory error correction. In this example, a 32-bit address space containing 4 GB of random access memory is to be scrubbed repeatedly to maintain early detection and correction of memory errors. An available memory scrubbing function, such as the one described as correctMemoryError( ) in the pseudocode listing of FIG. 6, is capable of scrubbing memory at the rate of 50 MB/sec. At 50 MB/sec., the scrubbing function can scrub 4 GB of memory in about 80 seconds. In this example, however, it is not desirable to turn over a computer processor to the scrubbing function for 80 contiguous seconds because such possession of the processor would represent an undesirably lengthy interruption in service to other applications. As a system engineering decision, it is determined useful to give the scrubbing function on average only 0.1 percent of a processor's overall processing capacity.

$$t_i = \left(\frac{P_L T_R}{S_R}\right) - t_r \qquad \text{Exp. 8}$$

Expression 8 is rewritten to denote that $T_R$ and $S_R$, the remaining time and the remaining quantity or scope of processing are considered in the beginning analysis as the overall processing time and overall quantity or scope of processing to be performed, as:

$$t_i = \left(\frac{P_L T_T}{S_T}\right) - t_r \qquad \text{Exp. 9}$$

where $t_i$ represents the variable delay period for an iteration, $P_L$ represents the portion of the overall quantity of data processing performed during the set processing period of the iteration (in this example, the amount of memory scrubbed in an iteration), $T_T$ represents the overall processing period, $S_T$ represents the overall amount of data processing (in this example, 4 GB of RAM), and $t_r$ represents the set processing period.

A $T_T$ of 80,000 seconds is needed to conduct 80 seconds of scrubbing using only 0.1 percent, or one thousandth, of a processor's processing capacity. The set processing period $t_r$ is selected as one millisecond, a time short enough to be practically unnoticeable. Then the amount of memory scrubbed in a typical iteration is estimated as the scrub rate multiplied by the set processing period:

$P_L$=50 MB/sec×0.001 sec=5×10$^{-7}$ GB

A typical value of the variable delay time can then be represented by Expression 9 as $t_i$=((5×10$^{-7}$ GB×8×10$^4$ sec)/4 GB)−1×10$^{-3}$ sec=9 msec.

That is, on average, this example scrubbing application can call its scrubbing function to run for 1.0 msec. after which each iteration may delay processing for about 9 msec, and the scrubbing operation will scrub the entire 4 GB of RAM in about 80,000 seconds. There are 86,400 seconds in a day. So a thread of execution running this application can scrub an entire RAM approximately daily using only one-tenth of one percent of one processor.

Figure 7:
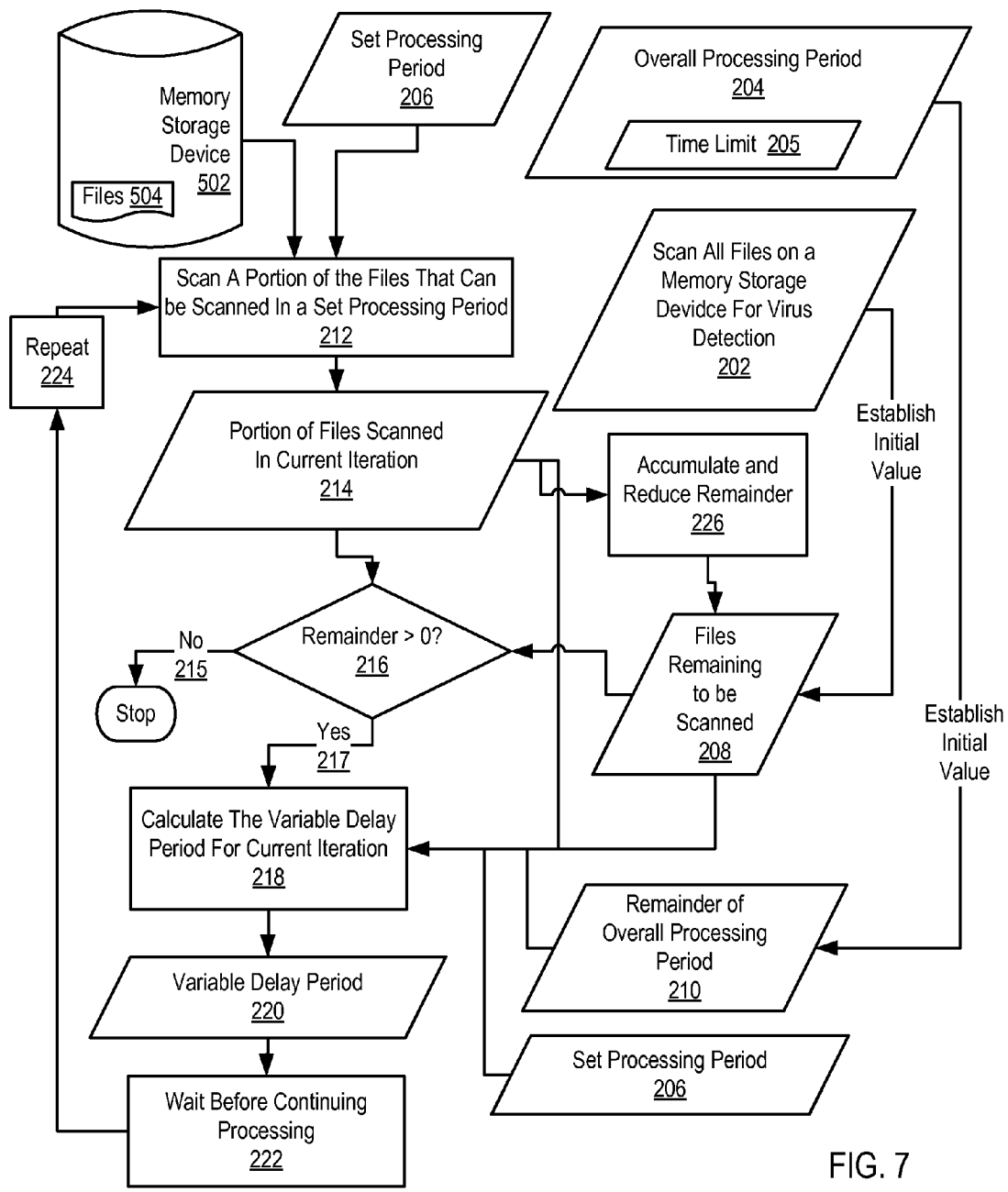
FIG. 7 sets forth a flow chart illustrating a further exemplary method for executing an overall quantity of data processing within an overall processing period according to embodiments of the present invention.

Scanning for Virus Detection all Files on a Memory Storage Device within an Overall Processing Period For further explanation, FIG. 7 sets forth a flow chart illustrating a further exemplary method for executing an overall quantity (202) of data processing within an overall processing period (204) according to embodiments of the present invention. The example of FIG. 7 is oriented to the problem domain of virus detection. In the method of FIG. 7, the data processing to be executed within an overall processing period (204) is virus detection, and the overall quantity of data processing is scanning (202) all files (504) on a memory storage device (502) for virus detection.

A virus is a undesired computer program that loads onto a computer without the knowledge or consent of the computer owner or operator. Viruses can also replicate themselves. All computer viruses are manmade. A simple virus that can make a copy of itself over and over again is relatively easy to produce. Even such a simple virus is dangerous because it may quickly use all available memory and bring a computer to a halt. An even more dangerous type of virus is one capable of transmitting itself across networks and bypassing security systems. Since 1987, when a virus infected ARPANET, a large network used by the Defense Department and many universities, many antivirus programs have become available. These programs periodically check a computer system for the best-known types of viruses.

The method of FIG. 7 includes scanning (212) for virus detection a portion of the files (504) of a memory storage device (502) that can be scanned in a set processing period (206), an example of executing repeatedly through a series of iterations a portion of the overall quantity of data processing that can be completed in a set processing period. In the example of FIG. 7, method steps (212, 216, 218, 222, 226), executed in a loop, make up an iteration, and each iteration includes a set processing period (206) and a variable delay period (220). The set processing period is a predefined period of an iteration when files are scanned for virus detection, that is, when a portion (214) of the files on a memory storage device (502) are scanned for virus detection. The set processing period typically is preset before iterations begin, so that the set processing period typically remains the same from iteration to iteration. The variable delay period (220) is a variable period of an iteration when no files are scanned for virus detection. As described above with reference to the method of FIG. 2, the variable delay period is variable because the duration of the variable delay period for an iteration is calculated during the iteration, so that the duration of the delay period may vary from iteration to iteration.

In the example of FIG. 7, executing a portion of the overall quantity of data processing that can be completed in a set processing period is represented by scanning (212) a portion of the files that can be scanned for virus detection in a set processing period (206). The portion of the overall quantity of data processing that can be so completed varies from iteration to iteration and is therefore tracked and reported by the execution process (212) as the portion of the files on the memory storage device that are scanned in the current iteration (214).

The method of FIG. 7 includes determining (216) whether the overall quantity of data processing, that is, scanning files on a memory storage device for virus detection, has been executed by comparing with zero a remainder (208) of the files that have not yet been scanned. The overall quantity of data processing (202) functions as a startup parameter to establish the initial value of the remainder (208), the initial number of files remaining to be scanned. That is, for example, if the total number of files to be scanned is 10,000, then the initial value of the remainder (208) is set to 10,000. The method of FIG. 7 then determines the remainder (208) of the overall quantity of data processing for each iteration by accumulating (226) the portions files scanned during each iteration and subtracting it from the overall number of files to on the memory storage device. That is, in the example of FIG. 7, the remainder (208) of the overall amount of data processing is the number of files remaining to be scanned, the total number of files on the memory storage device less the cumulative portion (214) of the files already scanned. That is, the remainder of the overall amount of data processing in this example is the number of files stored on the memory storage device less the cumulative portion of the files on the memory storage device scanned for virus detection in the current iteration and in previous iterations. If the remainder is zero (215), processing stops. If the remainder is greater than zero (217), processing continues with calculation of a variable delay period.

The method of FIG. 7 includes calculating (218) the variable delay period (220) for an iteration in dependence upon the set processing period (206), a portion (214) of the overall quantity of data processing (in this example, scanning files for virus detection) performed during the set processing period of the iteration, a remainder (208) of the overall quantity of data processing (files remaining to be scanned), and a remainder (210) of the overall processing period. In the method of FIG. 7, the overall processing period (204) may be characterized by a processing time limit (205). That is, the overall processing period may be identified as a start time and end time. The end time may be characterized as a processing time limit, a target time when the overall quantity of data processing is to be finished. In that case, the remainder (210) of the overall processing period may be implemented as the processing time limit less the time during the iteration when the variable delay period is calculated (218).

As described above with reference to the method of FIG. 2, in the example of FIG. 7, calculating (218) the variable delay period may be carried out by calculating the variable delay period (220) for each iteration so that a processing velocity for the iteration is equal to the overall processing velocity required to complete the remainder of the overall amount of data processing within the remainder of the overall processing period. That is, calculating (218) the variable delay period (220) may be carried out so that $$\frac{P_L}{t_r + t_i} = \frac{S_R}{T_R},$$ Exp. 5 where $t_i$ represents the variable delay period for each iteration, $P_L$ represents the portion of the overall quantity of data processing performed during the set processing period of the current iteration (in this example, the portion (214) of the files scanned in the current iteration), $T_R$ represents the remainder of the overall processing period, $S_R$ represents the remainder of the overall amount of data processing (in this example, the files (208) remaining to be scanned), and $t_r$ represents the set processing period. In this example, the expression $$\frac{P_L}{t_r + t_i}$$ Exp. 6 represents a processing velocity for the iteration, and the expression $$\frac{S_R}{T_R}$$ Exp. 7 represents an overall processing velocity required to complete the remainder of the overall amount of data processing within the remainder of the overall processing period. Exp. 1 may be rewritten to solve for the variable delay period $t_i$, so that calculating (218) the variable delay period (220) may be carried out according to the expression $$t_i = \left(\frac{P_L T_R}{S_R}\right) - t_r,$$ Exp. 8 where $t_i$ represents the variable delay period for an iteration, $P_L$ represents the portion of the overall quantity of data processing performed during the set processing period of the iteration, $T_R$ represents the remainder of the overall processing period, $S_R$ represents the remainder of the overall amount of data processing, and $t_r$ represents the set processing period.

The method of FIG. 7, having calculated (218) a variable delay period (220) for the current iteration, then waits (222) through the variable delay period before continuing processing. Waiting (222) may be accomplished through a system call such as a Unix sleep( ) call, or otherwise as will occur to those of skill in the art. Waiting through the variable delay period gives other applications an opportunity to execute. After waiting (222) through the variable delay period, processing in the method of FIG. 7 continues with repetition (224) of the steps in the iterative loop. The iterations continue until the remainder (208) of the overall quantity of data processing is reduced to zero (215).

Defragmenting all Files of a Disk Drive within an Overall Processing Period

Figure 8:
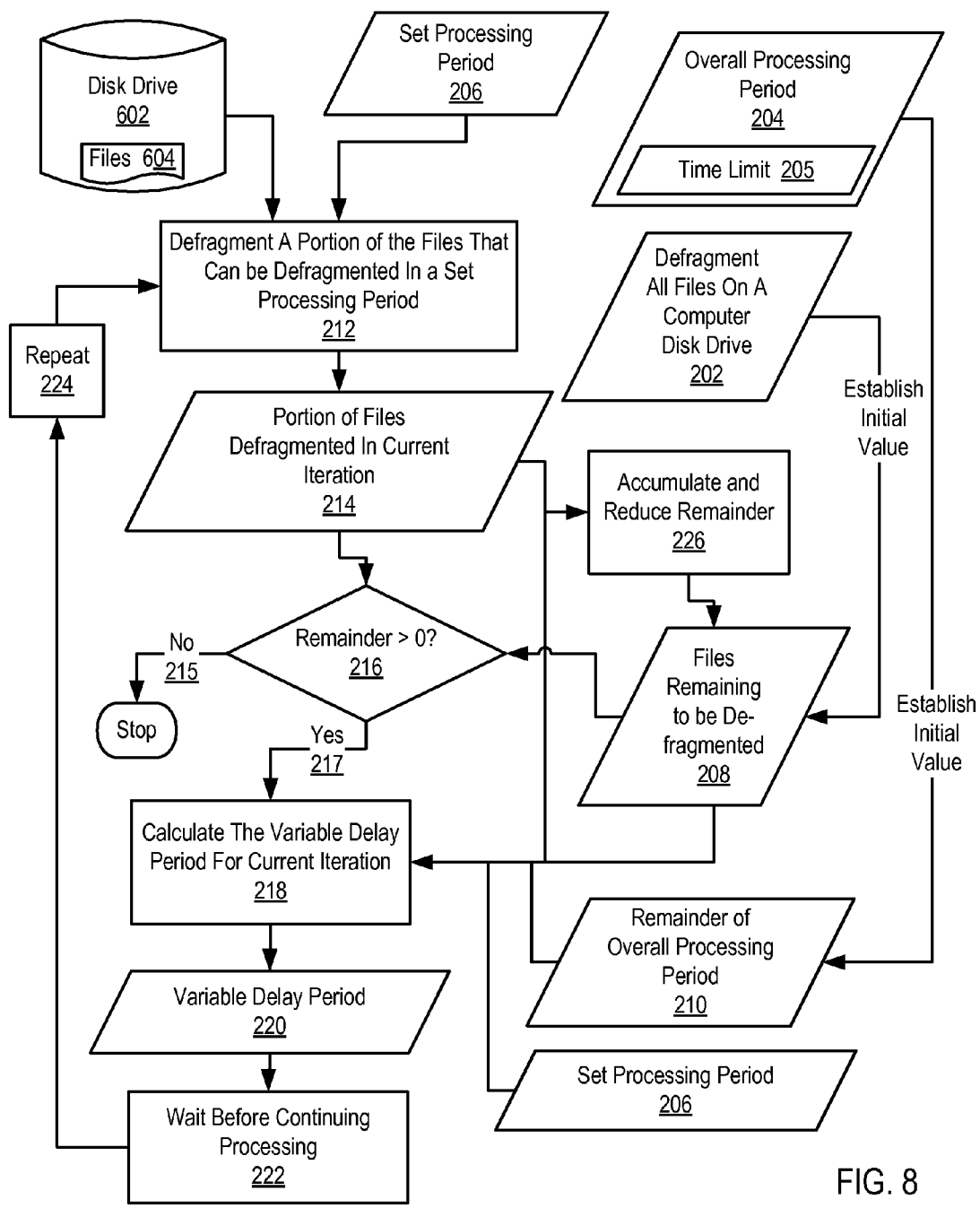
FIG. 8 sets forth a flow chart illustrating a further exemplary method for executing an overall quantity of data processing within an overall processing period according to embodiments of the present invention.

For further explanation, FIG. 8 sets forth a flow chart illustrating a further exemplary method for executing an overall quantity (202) of data processing within an overall processing period (204) according to embodiments of the present invention. The example of FIG. 8 is oriented to the problem domain of disk file defragmentation. In the method of FIG. 8, the data processing to be executed within an overall processing period (204) is disk file defragmentation, and the overall quantity of data processing is defragmenting (202) all the files (604) on a computer disk drive (602).

Disk file defragmentation refers to the condition of a disk in which files are divided into pieces scattered around the disk. Fragmentation occurs naturally when a disk is used frequently, creating, deleting, and modifying files. At some point, the operating system needs to store parts of a file in noncontiguous clusters. This may not visible to users until the disk is badly fragmented. Bad fragmentation, however, can slow down the speed at which data is accessed because the disk drive must search through different parts of the disk to put together a single file. Many operating systems provide utility or tool programs to defragment disks. In addition to operating system tools, other disk defragmentation applications, called optimizers or defragmenters, are available for purchase.

The method of FIG. 8 includes defragmenting (212) a portion of the files (604) that can be defragmented in a set processing period (206), an example of executing repeatedly through a series of iterations a portion of the overall quantity of data processing that can be completed in a set processing period. In the example of FIG. 8, method steps (212, 216, 218, 222, 226), executed in a loop, make up an iteration, and each iteration includes a set processing period (206) and a variable delay period (220). The set processing period is a predefined period of an iteration when files are defragmented, that is, when a portion (214) of files (604) on a computer disk drive (602) are defragmented. The set processing period typically is preset before iterations begin, so that the set processing period typically remains the same from iteration to iteration. The variable delay period (220) is a variable period of an iteration when no files are defragmented. As described above with reference to the method of FIG. 2, the variable delay period is variable because the duration of the variable delay period for an iteration is calculated during the iteration, so that the duration of the variable delay period may vary from iteration to iteration.

In the example of FIG. 8, defragmenting (212) a portion of the files (604) of a computer disk drive (602) that can be defragmented in a set processing period (206) is carried out by defragmenting all the files that can be defragmented in the set processing period. The portion of the overall number of files on the disk drive that can be so defragmented varies from iteration to iteration and is therefore tracked and reported by the execution process (212) as the portion (214) of the files on the disk drive defragmented in the current iteration (214).

The method of FIG. 8 includes determining (216) whether the overall quantity of data processing, that is, file defragmentation for all the files of a disk drive, has been executed by comparing with zero the number of files (208) remaining to be defragmented. The overall quantity of data processing (202), that is, the number of files on the disk drive, functions as a startup parameter to establish the initial value of the remainder (208). That is, for example, if the total number of files on the disk drive is 10,000, then the initial value of the number of files remaining to be defragmented (208) is set to 10,000. The method of FIG. 8 then determines the remainder (208) of the overall quantity of data processing for each iteration by accumulating (226) the portions of the files defragmented in each iteration and subtracting it from the number of files remaining to be defragmented. That is, in the example of FIG. 8, the remainder (208) of the overall amount of data processing is the number of files remaining to be defragmented, the overall number (202) number of files to be defragmented less the cumulative portion (214) of the files already defragmented. That is, the remainder of the overall amount of data processing is the number of files to be defragmented less the cumulative number of files already defragmented in the current iteration and in previous iterations. If the remainder is zero (215), processing stops. If the remainder is greater than zero (217), processing continues with calculation of a variable delay period.

The method of FIG. 8 includes calculating (218) the variable delay period (220) for an iteration in dependence upon the set processing period (206), a portion (214) of the overall quantity of data processing (in this example, file defragmentation) performed during the set processing period of the iteration, a remainder (208) of the overall quantity of data processing (files remaining to be defragmented), and a remainder (210) of the overall processing period. In the method of FIG. 8, the overall processing period (204) may be characterized by a processing time limit (205). That is, the overall processing period may be identified as a start time and end time. The end time may be characterized as a processing time limit, a target time when the overall quantity of data processing is to be finished. In that case, the remainder (210) of the overall processing period may be implemented as the processing time limit less the time during the iteration when the variable delay period is calculated (218).

As described above with reference to the method of FIG. 2, in the example of FIG. 8, calculating (218) the variable delay period may be carried out by calculating the variable delay period (220) for each iteration so that a processing velocity for the iteration is equal to the overall processing velocity required to complete the remainder of the overall amount of data processing within the remainder of the overall processing period. That is, calculating (218) the variable delay period (220) may be carried out so that $$\frac{P_L}{t_r + t_i} = \frac{S_R}{T_R}, \quad \text{Exp. 5}$$

where $t_i$ represents the variable delay period for each iteration, $P_L$ represents the portion of the overall quantity of data processing performed during the set processing period of the current iteration (in this example, the portion (214) of the files defragmented in the current iteration), $T_R$ represents the remainder of the overall processing period, $S_R$ represents the remainder of the overall amount of data processing (in this example, the number of files (208) remaining to be defragmented), and $t_r$ represents the set processing period. In this example, the expression $$\frac{P_L}{t_r + t_i} \quad \text{Exp. 6}$$

represents a processing velocity for the iteration, and the expression $$\frac{S_R}{T_R} \quad \text{Exp. 7}$$

represents an overall processing velocity required to complete the remainder of the overall amount of data processing within the remainder of the overall processing period. Exp. 1 may be rewritten to solve for the variable delay period $t_i$, so that calculating (218) the variable delay period (220) may be carried out according to the expression $$t_i = \left(\frac{P_L T_R}{S_R}\right) - t_r, \quad \text{Exp. 8}$$

where $t_i$ represents the variable delay period for an iteration, $P_L$ represents the portion of the overall quantity of data processing performed during the set processing period of the iteration, $T_R$ represents the remainder of the overall processing period, $S_R$ represents the remainder of the overall amount of data processing, and $t_r$ represents the set processing period.

The method of FIG. 8, having calculated (218) a variable delay period (220) for the current iteration, then waits (222) through the variable delay period before continuing processing. Waiting (222) may be accomplished through a system call such as a Unix sleep( ) call, or otherwise as will occur to those of skill in the art. Waiting through the variable delay period gives other applications an opportunity to execute. After waiting (222) through the variable delay period, processing in the method of FIG. 8 continues with repetition (224) of the steps in the iterative loop. The iterations continue until the remainder (208) of the overall quantity of data processing is reduced to zero (215).

Exemplary embodiments of the present invention are described largely in the context of a fully functional computer system for executing an overall quantity of data processing within an overall processing period. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for executing an overall quantity of data processing within an overall processing period, the apparatus comprising:
   a computer processor;
   a computer memory coupled for data transfer to the processor, the computer memory having disposed within it computer program instructions capable of:
   executing repeatedly through a series of iterations a portion of the overall quantity of data processing that can be completed in a set processing period, wherein each iteration includes the set processing period and a variable delay period; and
   calculating the variable delay period for an iteration in dependence upon the set processing period, a portion of the overall quantity of data processing performed during the set processing period of the iteration, the overall quantity of data processing, and the overall processing period.

2. The apparatus of claim 1 wherein calculating the variable delay period further comprises calculating the variable delay period for each iteration so that a processing velocity for the iteration is equal to the overall processing velocity required to complete the overall amount of data processing within the overall processing period.

3. The apparatus of claim 1 wherein calculating the variable delay period further comprises calculating the variable delay period according to the expression:

$$t_i = \left(\frac{P_L T_T}{S_T}\right) - t_r, \text{ wherein:}$$

$t_i$ represents the variable delay period for an iteration,
$P_L$ represents the portion of the overall quantity of data processing performed during the set processing period of the iteration,
$T_T$ represents the overall processing period,
$S_T$ represents the overall amount of data processing, and
$t_r$ represents the set processing period.

4. The apparatus of claim 1 wherein:
   calculating the variable delay period for an iteration in dependence upon the set processing period, a portion of the overall quantity of data processing performed during the set processing period of the iteration, the overall quantity of data processing, and the overall processing period further comprises:
   calculating the variable delay period for an iteration in dependence upon the set processing period, a portion of the overall quantity of data processing performed during the set processing period of the iteration, a remainder of the overall quantity of data processing, and a remainder of the overall processing period.

5. The apparatus of claim 4 wherein the overall processing period is characterized by a processing time limit, and the remainder of the overall processing period comprises the processing time limit less the time during the iteration when the variable delay period is calculated.

6. The apparatus of claim 4 wherein calculating the variable delay period further comprises calculating the variable delay period for each iteration so that a processing velocity for the iteration is equal to the overall processing velocity required to complete the remainder of the overall amount of data processing within the remainder of the overall processing period.

7. The apparatus of claim 4 wherein calculating the variable delay period further comprises calculating the variable delay period according to the expression:

$$t_i = \left(\frac{P_L T_R}{S_R}\right) - t_r, \text{ wherein:}$$

$t_i$ represents the variable delay period for an iteration,
$P_L$ represents the portion of the overall quantity of data processing performed during the set processing period of the iteration,
$T_R$ represents the remainder of the overall processing period,
$S_R$ represents the remainder of the overall amount of data processing, and
$t_r$ represents the set processing period.

8. The apparatus of claim 4 wherein:
the data processing to be executed within an overall processing period comprises memory error correction;
the overall quantity of data processing to be executed comprises correcting memory errors for a computer's entire random access memory;
the overall processing period is characterized by a processing time limit;
the set processing period comprises a predefined period of an iteration when memory errors are corrected;
the portion of the overall quantity of data processing performed during the set processing period of the iteration comprises the quantity of memory for which memory errors are corrected during the set processing period of the iteration;
the remainder of the overall amount of data processing comprises the size of the computer memory less the cumulative quantity of computer memory for which memory errors were corrected in previous iterations; and the remainder of the overall processing period comprises the processing time limit less the time during the iteration when the variable delay period is calculated.

9. The apparatus of claim 4 wherein:

the data processing to be executed within an overall processing period comprises virus detection;

the overall quantity of data processing to be executed comprises scanning all files on a memory storage device for virus detection;

the overall processing period is characterized by a processing time limit;

the set processing period comprises a predefined period of an iteration when files are scanned for virus detection;

the portion of the overall quantity of data processing performed during the set processing period of the iteration comprises the portion of the files on the memory storage device scanned for virus detection during the set processing period of the iteration;

the remainder of the overall amount of data processing comprises the number of files stored on the memory storage device less the cumulative portion of the files on the memory storage device scanned for virus detection in previous iterations; and the remainder of the overall processing period comprises the processing time limit less the time during the iteration when the variable delay period is calculated.

10. The apparatus of claim 4 wherein:

the data processing to be executed within an overall processing period comprises disk file defragmentation;

the overall quantity of data processing to be executed comprises defragmenting all the files on a computer disk drive;

the overall processing period is characterized by a processing time limit;

the set processing period comprises a predefined period of an iteration when disk files are defragmented;

the portion of the overall quantity of data processing performed during the set processing period of the iteration comprises the portion of the files on the computer disk drive defragmented during an iteration;

the remainder of the overall amount of data processing comprises the number of files stored on the computer disk drive less the cumulative portion of the files on the computer disk drive defragmented in previous iterations; and the remainder of the overall processing period comprises the processing time limit less the time during the iteration when the variable delay period is calculated.

11. A system for executing an overall quantity of data processing within an overall processing period, the system comprising:

means for executing repeatedly through a series of iterations a portion of the overall quantity of data processing that can be completed in a set processing period, wherein each iteration includes the set processing period and a variable delay period; and means for calculating the variable delay period for an iteration in dependence upon the set processing period, a portion of the overall quantity of data processing performed during the set processing period of the iteration, the overall quantity of data processing, and the overall processing period.

12. The system of claim 11 wherein means for calculating the variable delay period further comprises means for calculating the variable delay period for each iteration so that a processing velocity for the iteration is equal to the overall processing velocity required to complete the overall amount of data processing within the overall processing period.

13. The system of claim 11 wherein means for calculating the variable delay period further comprises means for calculating the variable delay period according to the expression:

$$t_i = \left(\frac{P_L T_T}{S_T}\right) - t_r, \text{ wherein:}$$

$t_i$ represents the variable delay period for an iteration, $P_L$ represents the portion of the overall quantity of data processing performed during the set processing period of the iteration, $T_T$ represents the overall processing period, $S_T$ represents the overall amount of data processing, and $t_r$ represents the set processing period.

14. The system of claim 11 wherein:

means for calculating the variable delay period for an iteration in dependence upon the set processing period, a portion of the overall quantity of data processing performed during the set processing period of the iteration, the overall quantity of data processing, and the overall processing period further comprises:

means for calculating the variable delay period for an iteration in dependence upon the set processing period, a portion of the overall quantity of data processing performed during the set processing period of the iteration, a remainder of the overall quantity of data processing, and a remainder of the overall processing period.

15. The system of claim 14 wherein the overall processing period is characterized by a processing time limit, and the remainder of the overall processing period comprises the processing time limit less the time during the iteration when the variable delay period is calculated.

16. The system of claim 14 wherein means for calculating the variable delay period further comprises means for calculating the variable delay period for each iteration so that a processing velocity for the iteration is equal to the overall processing velocity required to complete the remainder of the overall amount of data processing within the remainder of the overall processing period.

17. The system of claim 14 wherein means for calculating the variable delay period further comprises means for calculating the variable delay period according to the expression:

$$t_i = \left(\frac{P_L T_R}{S_R}\right) - t_r, \text{ wherein:}$$

$t_i$ represents the variable delay period for an iteration, $P_L$ represents the portion of the overall quantity of data processing performed during the set processing period of the iteration, $T_R$ represents the remainder of the overall processing period, $S_R$ represents the remainder of the overall amount of data processing, and $t_r$ represents the set processing period.

18. The system of claim 14 wherein:

the data processing to be executed within an overall processing period comprises memory error correction;

the overall quantity of data processing to be executed comprises correcting memory errors for a computer's entire random access memory;

the overall processing period is characterized by a processing time limit;

the set processing period comprises a predefined period of an iteration when memory errors are corrected;

the portion of the overall quantity of data processing performed during the set processing period of the iteration comprises the quantity of memory for which memory errors are corrected during the set processing period of the iteration;

the remainder of the overall amount of data processing comprises the size of the computer memory less the cumulative quantity of computer memory for which memory errors were corrected in previous iterations; and the remainder of the overall processing period comprises the processing time limit less the time during the iteration when the variable delay period is calculated.

19. The system of claim 14 wherein:

the data processing to be executed within an overall processing period comprises virus detection;

the overall quantity of data processing to be executed comprises scanning all files on a memory storage device for virus detection;

the overall processing period is characterized by a processing time limit;

the set processing period comprises a predefined period of an iteration when files are scanned for virus detection;

the portion of the overall quantity of data processing performed during the set processing period of the iteration comprises the portion of the files on the memory storage device scanned for virus detection during the set processing period of the iteration;

the remainder of the overall amount of data processing comprises the number of files stored on the memory storage device less the cumulative portion of the files on the memory storage device scanned for virus detection in previous iterations; and the remainder of the overall processing period comprises the processing time limit less the time during the iteration when the variable delay period is calculated.

20. The system of claim 14 wherein:

the data processing to be executed within an overall processing period comprises disk file defragmentation;

the overall quantity of data processing to be executed comprises defragmenting all the files on a computer disk drive;

the overall processing period is characterized by a processing time limit;

the set processing period comprises a predefined period of an iteration when disk files are defragmented;

the portion of the overall quantity of data processing performed during the set processing period of the iteration comprises the portion of the files on the computer disk drive defragmented during an iteration;

the remainder of the overall amount of data processing comprises the number of files stored on the computer disk drive less the cumulative portion of the files on the computer disk drive defragmented in previous iterations; and the remainder of the overall processing period comprises the processing time limit less the time during the iteration when the variable delay period is calculated.

21. A computer program product for executing an overall quantity of data processing within an overall processing period, the computer program product disposed upon a non-transitory computer readable medium, the non-transitory computer readable medium containing instructions stored therein for causing the processor to perform the steps of:

execute repeatedly through a series of iterations a portion of the overall quantity of data processing that can be completed in a set processing period, wherein each iteration includes the set processing period and a variable delay period; and calculate the variable delay period for an iteration in dependence upon the set processing period, a portion of the overall quantity of data processing performed during the set processing period of the iteration, the overall quantity of data processing, and the overall processing period.

22. The computer program product of claim 21 wherein the computer readable non-transmission medium comprises a recordable medium.

23. The computer program product of claim 21 wherein computer program instructions that cause the computer to calculate the variable delay period further comprise computer program instructions that cause the computer to calculate the variable delay period for each iteration so that a processing velocity for the iteration is equal to the overall processing velocity required to complete the overall amount of data processing within the overall processing period.

24. The computer program product of claim 21 wherein the computer program instructions that cause the computer to calculate the variable delay period further comprise computer program instructions that cause the computer to calculate the variable delay period according to the expression:

$$t_i = \left(\frac{P_L T_T}{S_T}\right) - t_r, \text{ wherein:}$$

$t_i$ represents the variable delay period for an iteration, $P_L$ represents the portion of the overall quantity of data processing performed during the set processing period of the iteration, $T_T$ represents the overall processing period, $S_T$ represents the overall amount of data processing, and $t_r$ represents the set processing period.

25. The computer program product of claim 21 wherein:

the computer program instructions that cause the computer to calculate the variable delay period for an iteration in dependence upon the set processing period, a portion of the overall quantity of data processing performed during the set processing period of the iteration, the overall quantity of data processing, and the overall processing period further comprise:

computer program instructions that cause the computer to calculate the variable delay period for an iteration in dependence upon the set processing period, a portion of the overall quantity of data processing performed during the set processing period of the iteration, a remainder of the overall quantity of data processing, and a remainder of the overall processing period.

26. The computer program product of claim 23 wherein the overall processing period is characterized by a processing time limit, and the remainder of the overall processing period comprises the processing time limit less the time during the iteration when the variable delay period is calculated.

27. The computer program product of claim 23 wherein computer program instructions that cause the computer to calculate the variable delay period further comprise computer program instructions that cause the computer to calculate the variable delay period for each iteration so that a processing velocity for the iteration is equal to the overall processing velocity required to complete the remainder of the overall amount of data processing within the remainder of the overall processing period.

28. The computer program product of claim 23 wherein computer program instructions that cause the computer to calculate the variable delay period further comprise computer program instructions that cause the computer to calculate the variable delay period according to the expression:

$$t_i = \left(\frac{P_L T_R}{S_R}\right) - t_r, \text{ wherein:}$$

$t_i$ represents the variable delay period for an iteration,
$P_L$ represents the portion of the overall quantity of data processing performed during the set processing period of the iteration,
$T_R$ represents the remainder of the overall processing period,
$S_R$ represents the remainder of the overall amount of data processing, and
$t_r$ represents the set processing period.

29. The computer program product of claim 23 wherein:
the data processing to be executed within an overall processing period comprises memory error correction;
the overall quantity of data processing to be executed comprises correcting memory errors for a computer's entire random access memory;
the overall processing period is characterized by a processing time limit;
the set processing period comprises a predefined period of an iteration when memory errors are corrected;
the portion of the overall quantity of data processing performed during the set processing period of the iteration comprises the quantity of memory for which memory errors are corrected during the set processing period of the iteration;
the remainder of the overall amount of data processing comprises the size of the computer memory less the cumulative quantity of computer memory for which memory errors were corrected in previous iterations; and
the remainder of the overall processing period comprises the processing time limit less the time during the iteration when the variable delay period is calculated.

30. The computer program product of claim 23 wherein:
the data processing to be executed within an overall processing period comprises virus detection;
the overall quantity of data processing to be executed comprises scanning all files on a memory storage device for virus detection;
the overall processing period is characterized by a processing time limit;
the set processing period comprises a predefined period of an iteration when files are scanned for virus detection;
the portion of the overall quantity of data processing performed during the set processing period of the iteration comprises the portion of the files on the memory storage device scanned for virus detection during the set processing period of the iteration;
the remainder of the overall amount of data processing comprises the number of files stored on the memory storage device less the cumulative portion of the files on the memory storage device scanned for virus detection in previous iterations; and
the remainder of the overall processing period comprises the processing time limit less the time during the iteration when the variable delay period is calculated.

31. The computer program product of claim 23 wherein:
the data processing to be executed within an overall processing period comprises disk file defragmentation;
the overall quantity of data processing to be executed comprises defragmenting all the files on a computer disk drive;
the overall processing period is characterized by a processing time limit;
the set processing period comprises a predefined period of an iteration when disk files are defragmented;
the portion of the overall quantity of data processing performed during the set processing period of the iteration comprises the portion of the files on the computer disk drive defragmented during an iteration;
the remainder of the overall amount of data processing comprises the number of files stored on the computer disk drive less the cumulative portion of the files on the computer disk drive defragmented in previous iterations; and
the remainder of the overall processing period comprises the processing time limit less the time during the iteration when the variable delay period is calculated.

* * * * *